UNITED STATES PATENT OFFICE.

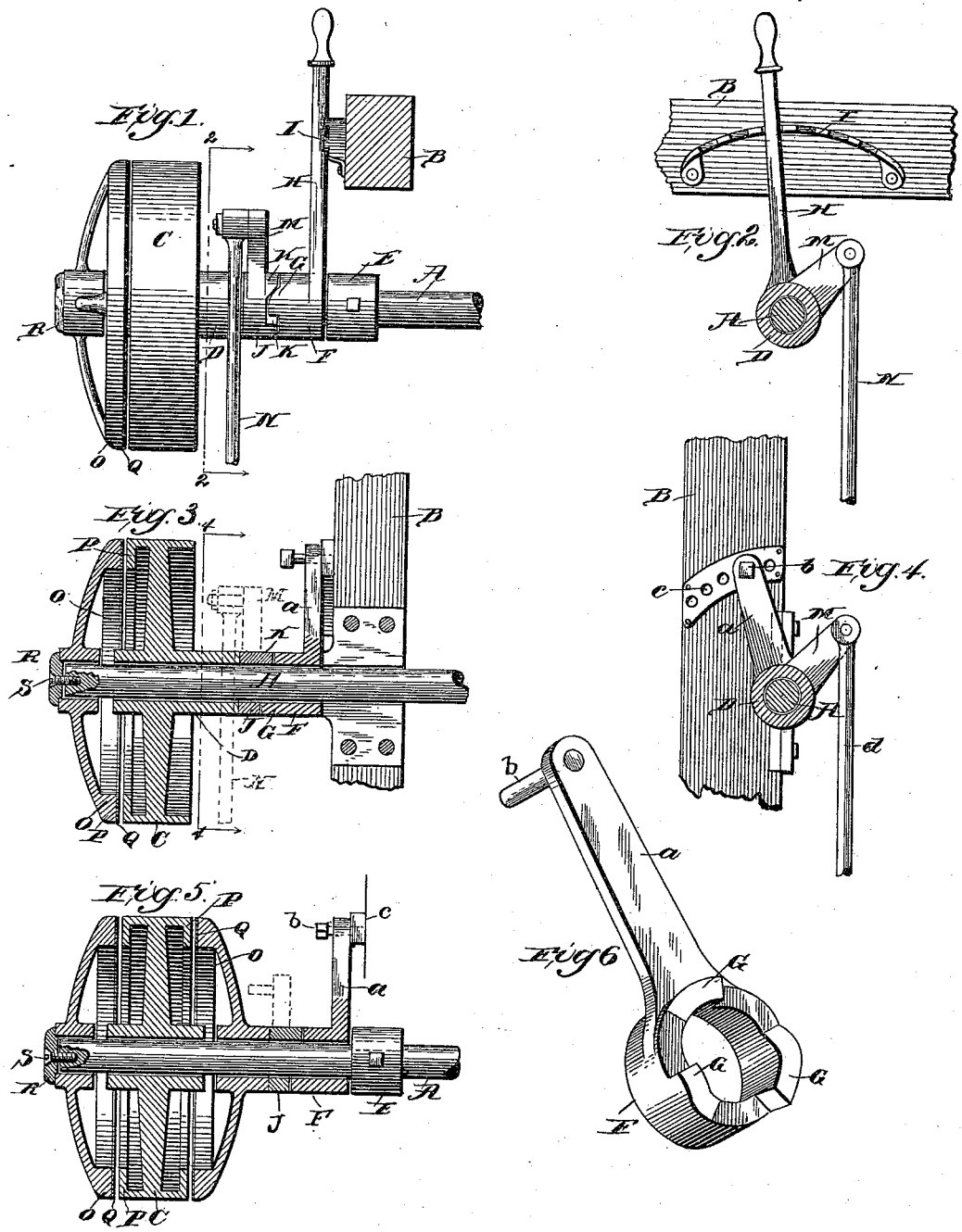

LEWIS H. WATSON, OF CHICAGO, ILLINOIS.

FRICTION-CLUTCH.

SPECIFICATION forming part of Letters Patent No. 430,097, dated June 10, 1890.

Application filed August 19, 1889. Serial No. 321,211. (No model.)

*To all whom it may concern:*

Be it known that I, LEWIS H. WATSON, a citizen of the United States, and a resident of Chicago, in the county of Cook and State of Illinois, have invented certain new and useful Improvements in Friction-Clutches, of which the following is a specification.

This invention relates to improvements in that class of friction-clutches in which a flat friction disk or ring is opposed to a flat frictional flange upon the power-transmitting wheel, and one of said members is moved into contact with the other by suitable levers or by cams rotating upon, but independent of, the shaft upon which the clutch is mounted. Such cams, however, so far as I am aware, have invariably consisted of a single movable spirally-formed cam opposing a similar fixed cam, which construction is objectionable, because there is practically no limit to the power which may be transmitted to the clutch, and consequently the clutch, as well as the mechanism operated thereby, is constantly exposed to the dangers resulting from the carelessness of the operator.

The object of this invention is to have the clutch-operating mechanism of such character that the maximum amount of power for producing the desired friction may be limited, but at the same time may be regulated or adjusted to the different kinds of work which the clutch is required to perform.

Another object is to have the clutch of such character that it may be either manually or mechanically and automatically operated, and that too without requiring an objectionable nicety of adjustment or danger of injury to the parts should the stroke in either case be greater than required to produce the maximum degree of friction.

I attain these objects by the devices illustrated in the accompanying drawings, in which—

Figure 1 represents a side elevation of a friction-clutch embodying my invention, showing the same adapted to be shifted in and out of gear by hand; Fig. 2, a vertical section thereof on the line 2 2; Fig. 3, a central vertical section through the clutch; Fig. 4, a vertical section on the line 4 4 of Fig. 3; Fig. 5, a central vertical section similar to Fig. 3, showing the modification of my invention in which two friction-rings are employed, and Fig. 6 a detail perspective view of the cam-clutch lever.

Similar letters of reference indicate the same parts in the several figures of the drawings.

Referring by letter to the accompanying drawings, A indicates the power-shaft of a machine; B, a portion of the machine-frame, and C a belt-pulley, or it may be any other kind of wheel, loosely mounted upon the shaft and provided with an elongated hub D, between which and a collar E, fixed upon the shaft, is located a sleeve F, loose upon said shaft and provided with any desirable number of cams G upon the end face thereof, opposite the collar E, the cam-sleeve being also provided with a radial arm H, adapted and arranged to engage a toothed rack I, rigidly secured to the stationary portion B of the frame of the machine, and constituting a lever for rotating the cam-sleeve.

Between the sleeve F and the hub D of the pulley, and entirely filling the space therebetween, is another sleeve J, loose upon the shaft and provided on the end face next the sleeve F with a series of cams K, corresponding in number and location with the cams G upon the sleeve F, but arranged reversely as to said cams—that is to say, each of the cams on both sleeves is provided with a straight and a curve portion, the curve portion leading up to the straight portion from the face of the sleeve, the curves of each opposing pair of cams, however, extending in the opposite direction, so as to bring the two curved or inclined surfaces together. The cam-sleeve J is also provided with a radial arm M, to the free end of which is pivotally secured one end of a rod N, the opposite end of which may be attached to any reciprocating portion of the machine when it is desired to actuate the clutch at intervals or a stationary portion of the machine when the lever alone is employed to operate the clutch.

Keyed, bolted, or otherwise rigidly secured to the shaft A at the opposite side of the pulley C is an annular friction ring, plate, or disk O, and preferably provided on the face thereof opposing the annular flange P on the pulley with a facing of paper Q or other suitable material, that will increase friction between said members. These parts—that is, the friction-plate, pulley, the cam-sleeve J, and the opposing cam-sleeve F—are so arranged upon the shaft that normally the latter three are in contact, while the pulley, which is capable of endwise movement upon the shaft, is out of frictional contact with the plate or disk, but so disposed that when the cam-lever M is actuated, so as to actuate the same upon the shaft, it will cause the pulley to move endwise upon the shaft into contact with the friction-plate, and thus transmit its power thereto. In this position it will be locked by the opposing straight surfaces of the cams upon the sleeves F and J, which latter surfaces are intended to oppose each other when the clutch is in operation. It will be understood that with the construction shown in Figs. 1 and 2 the cam-sleeve F is practically fixed—that is to say, it remains stationary during the operation of the machine—while the cam-sleeve J, through the medium of its lever M and the reciprocating rod N, is alone employed to shift the pulley upon the shaft and throw the clutch in and out of gear, operating to do this at such intervals as may be required; but the operation of the clutch is controlled by the cam-sleeve F through the medium of the hand-lever H, which may be shifted so as to cause the clutch to engage at each reciprocation of the rod N, or so as to produce sufficient lost motion of the sleeve J to prevent the pulley being thrown into frictional contact with the disk, and thus nullify the action of said sleeve, which may, however, continue without producing any result, either detrimental or otherwise.

The adjustment of the amount of friction in the clutch is preferably made by means of the washer R and the screw-bolt S working therethrough and engaging the end of the shaft A, as more clearly shown in Fig. 3, by which the frictional contact between the pulley and the disk on the hub of which the washer bears may be adjusted to the maximum degree of nicety, for in practice it is preferred that the collar E should remain fixed upon the shaft after the parts are adjusted.

The cam-sleeves, when in operation, should make sufficient movement at all times to bring the straight portions of the cams upon each other, so that the frictional contact between the pulley and disk will be thereby limited, and any further movement of the lever M after the straight portions of the cams oppose each other will obviously have no effect upon the parts. Whenever this lever is moved in the opposite direction by the rod N back to its normal position and the pressure of the sleeve is removed from the belt-pulley, the latter, by reason of the resistance of the shaft to rotation, will instantly release the friction-plate and move endwise upon the shaft out of contact with the plate, which endwise or lateral movement is materially promoted by the continuous rotation of the pulley.

In Figs. 3 and 4 of the drawings I have shown the same parts of my clutch, but operating in exactly the reverse manner to those of Figs. 1 and 2—that is to say, the arm a of the sleeve F is fixedly adjusted by means of a bolt b passing therethrough and through perforations in a segment-plate c, attached to a stationary portion of the frame of the machine, while the rod d, instead of being a reciprocating rod, has its opposite end attached to a hand or foot lever, by means of which the sleeve may be operated in one or both directions, or in one direction only by the hand or foot lever, and in the opposite direction by a spring, or in any other well known and convenient manner, the purpose of this arrangement being to enable the operation of the machine at intervals, when desired, and for any length of time, instead of at regular intervals, as in the case of the reciprocating rod of the construction shown in Figs. 1 and 2. In all other respects the operation of the two forms of clutch is identical. It is also within my invention to employ two frictional plates or disks, as illustrated in Fig. 5, one at each side of the pulley, to operate in exactly the same manner as the preferred construction just described, the second friction-disk being splined upon the shaft so as to be capable of endwise movement and interspersed between the pulley and cam-sleeve J, which latter acts directly thereon, causing the pulley to be tightly gripped between the opposing friction-disks. By this arrangement the frictional surface obtained is just double what is possible with a single device. From the foregoing it will be understood that the extent of the opposing frictional surfaces of the pulley and friction-plate is limited only by the size of the pulley, for it may extend from the hub to the periphery thereof, and thus materially increase the frictional surface, rendering the operation of the parts far more gentle and effective.

By the employment of a frictional clutch such as herein described all jerking and jarring in starting and stopping the machinery to which it is applied are avoided, for the action thereof is smooth and gentle as possible, although equally as prompt as the other devices heretofore employed, and besides which objectionable binding between the frictional surfaces is absolutely prevented. The clutch is automatically separated, so as to arrest the operation of the machine.

The power of a clutch such as herein described is limited only by the leverage given the operator, for no matter how tightly the frictional surfaces are held in contact during the operation of the machine they will automatically separate and require the exercise of no material power upon the part of the operator or of the machine in order to separate them.

In conclusion I may state that it will be no departure from the spirit of my invention to have the friction-disk splined upon the shaft and alone capable of endwise movement thereon, and interposed between the pulley and the cam-lever, with the pulley loose, but incapable of endwise movement upon said shaft, for the result would be the same with either arrangement, the first-described, however, being the preferred construction, because of the greater facility with which the clutch may be separated.

Having described my invention, what I claim, and desire to secure by Letters Patent, is—

1. In a friction-clutch, the combination, with the pulley and the friction-plate, of a fixed sleeve provided with cams on the end thereof, and a rotatable sleeve, also provided with cams on the end thereof, opposing the fixed sleeve, the cams on each of said sleeves terminating in straight portions in a plane at right angles to the axis of said sleeves, substantially as described.

2. In a friction-clutch, the combination, with a shaft, a fixed sleeve provided with cams on the end thereof, arranged around said shaft, and a pulley loosely mounted on said shaft and provided with an annular flange, of a friction disk or plate rigidly mounted on said shaft opposing said annular flange and a cam-sleeve, also loosely mounted on said shaft, interposed between said pulley and the bearing, provided with cams corresponding with and engaging the cams on said fixed sleeve, one or all of said cams terminating in a straight portion in a plane at right angles to the axis of said sleeves, substantially as described.

3. In a friction-clutch, the combination, with a shaft, a collar fixed thereon, a wheel loosely mounted on said shaft provided with an annular flange, and a friction disk or plate rigidly mounted on said shaft opposing said annular flange, of a pair of sleeves mounted loosely on said shaft and confined between said collar and the hub of the pulley, said sleeves being provided with interlocking cams on the opposing ends thereof, and one of said sleeves being fixed and the other rotatable, substantially as described.

4. In a friction-clutch, the combination, with a shaft, a collar fixed thereon, a wheel loosely mounted thereon provided with an annular flange, and a friction disk or plate rigidly mounted on said shaft opposing said flange, of a pair of sleeves provided with cams on the opposing ends thereof and loosely mounted upon said shaft between the collar and pulley, a radial arm projecting from each of said sleeves, one of which is secured to a stationary portion of the machine, and a rod for operating the other arm, substantially as described.

LEWIS H. WATSON.

Witnesses:
W. R. OMOHUNDRO,
R. C. OMOHUNDRO.